(12) United States Patent
Ravichandran

(10) Patent No.: US 12,385,315 B2
(45) Date of Patent: Aug. 12, 2025

(54) VEHICULAR CLOSURE OPENING DEVICE USING A MICRO-LENS ARRAY AT CLOSURE PANEL

(71) Applicant: Magna Mirrors of America, Inc., Holland, MI (US)

(72) Inventor: Sethuraman Ravichandran, Aschaffenburg (DE)

(73) Assignee: Magna Mirrors of America, Inc., Holland, MI (US)

( * ) Notice: Subject to any disclaimer, the term of this patent is extended or adjusted under 35 U.S.C. 154(b) by 155 days.

(21) Appl. No.: 18/355,482

(22) Filed: Jul. 20, 2023

(65) Prior Publication Data
US 2024/0026724 A1    Jan. 25, 2024

Related U.S. Application Data

(60) Provisional application No. 63/369,074, filed on Jul. 22, 2022.

(51) Int. Cl.
*E05F 15/76*    (2015.01)

(52) U.S. Cl.
CPC ......... *E05F 15/76* (2015.01); *E05Y 2400/822* (2013.01); *E05Y 2400/86* (2013.01); *E05Y 2900/531* (2013.01)

(58) Field of Classification Search
CPC .... E05F 15/76; E05F 15/73; E05Y 2400/822; E05Y 2400/86; E05Y 2900/531; B60Q 1/2669; B60Q 2400/40; G07C 2209/65; G07C 9/00309; E05B 81/77; E05B 85/107; G03H 1/0005

USPC ......................................................... 340/5.72
See application file for complete search history.

(56) References Cited

U.S. PATENT DOCUMENTS

| | | | |
|---|---|---|---|
| 5,379,033 A * | 1/1995 | Fujii ................. | G07C 9/00182 340/5.72 |
| 6,291,905 B1 | 9/2001 | Drummond et al. | |
| 6,396,408 B2 | 5/2002 | Drummond et al. | |
| 6,477,464 B2 | 11/2002 | McCarthy et al. | |
| 6,577,226 B1 * | 6/2003 | Steiner .............. | G07C 9/00309 340/5.72 |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |

(Continued)

*Primary Examiner* — Nam V Nguyen
(74) *Attorney, Agent, or Firm* — HONIGMAN LLP

(57) ABSTRACT

A vehicular closure panel opening system includes a closure panel handle assembly configured to mount at a closure panel of a vehicle. A projection device is electrically operable to emit light. The light emitted by the projection device projects a three-dimensional (3D) hologram along a handle region of an outer surface of the closure panel. The system, with the 3D hologram projected at the handle region of the outer surface of the closure panel and based on processing of sensor data captured by a sensor operable to sense objects at the handle region, determines presence of an object at or near the projected 3D hologram. The system, responsive to determining presence of the object at or near the projected 3D hologram, actuates a latch mechanism of the closure panel to release the latch mechanism and allow the closure panel to move from a closed position toward an open position.

30 Claims, 5 Drawing Sheets

(56) References Cited

U.S. PATENT DOCUMENTS

| | | | |
|---|---|---|---|
| 6,876,775 B2 | 4/2005 | Torunoglu | |
| 6,906,793 B2 | 6/2005 | Bamji et al. | |
| 6,919,549 B2 | 7/2005 | Bamji et al. | |
| 6,977,619 B2 | 12/2005 | March et al. | |
| 7,038,577 B2 | 5/2006 | Pawlicki et al. | |
| 7,102,487 B2 * | 9/2006 | Mafune | G07C 9/00309 |
| | | | 340/552 |
| 7,157,685 B2 | 1/2007 | Bamji et al. | |
| 7,176,438 B2 | 2/2007 | Bamji et al. | |
| 7,203,356 B2 | 4/2007 | Gokturk et al. | |
| 7,212,663 B2 | 5/2007 | Tomasi | |
| 7,248,151 B2 * | 7/2007 | Mc Call | B60R 25/2045 |
| | | | 340/5.2 |
| 7,283,034 B2 * | 10/2007 | Nakamura | E05B 81/78 |
| | | | 340/5.2 |
| 7,283,213 B2 | 10/2007 | O'Connor et al. | |
| 7,310,431 B2 | 12/2007 | Gokturk et al. | |
| 7,321,111 B2 | 1/2008 | Bamji et al. | |
| 7,340,077 B2 | 3/2008 | Gokturk et al. | |
| 7,352,454 B2 | 4/2008 | Bamji et al. | |
| 7,375,803 B1 | 5/2008 | Bamji | |
| 7,379,100 B2 | 5/2008 | Gokturk et al. | |
| 7,379,163 B2 | 5/2008 | Rafii et al. | |
| 7,405,812 B1 | 7/2008 | Bamji | |
| 7,408,627 B2 | 8/2008 | Bamji et al. | |
| 7,720,580 B2 | 5/2010 | Higgins-Luthman | |
| 7,855,755 B2 | 12/2010 | Weller et al. | |
| 9,024,721 B2 * | 5/2015 | McBride | B60R 25/245 |
| | | | 340/5.2 |
| 9,406,179 B2 * | 8/2016 | Ayeva | G07C 9/28 |
| 10,261,470 B2 * | 4/2019 | Rakshit | G02B 3/14 |
| 10,275,098 B1 * | 4/2019 | Clements | G02B 30/56 |
| 10,378,263 B2 | 8/2019 | Podkopayev | |
| 10,589,716 B2 | 3/2020 | Sobecki et al. | |
| 10,744,930 B2 | 8/2020 | Sobecki et al. | |
| 10,831,157 B2 * | 11/2020 | Christmas | G03H 1/2249 |
| 10,866,562 B2 * | 12/2020 | Kim | G03H 1/024 |
| 10,914,110 B2 * | 2/2021 | Mitchell | G01S 13/88 |
| 11,131,864 B2 | 9/2021 | Ferri | |
| 11,188,154 B2 * | 11/2021 | Rakshit | G06F 3/0426 |
| 11,371,270 B2 | 6/2022 | Leonardi et al. | |
| 11,402,236 B2 * | 8/2022 | Vaysse | E05B 81/77 |
| 11,542,732 B2 | 1/2023 | Schatz | |
| 11,851,920 B2 | 12/2023 | Peterson et al. | |
| 11,866,983 B2 | 1/2024 | Schatz et al. | |
| 11,885,158 B2 | 1/2024 | Cumbo et al. | |
| 11,927,036 B2 * | 3/2024 | Spick | H03K 17/9545 |
| 2009/0109176 A1 * | 4/2009 | Fein | G06F 3/048 |
| | | | 345/158 |
| 2010/0007463 A1 | 1/2010 | Dingman et al. | |
| 2012/0170089 A1 * | 7/2012 | Kim | G06F 1/1647 |
| | | | 359/9 |
| 2012/0223909 A1 * | 9/2012 | Tse | G06F 3/017 |
| | | | 345/173 |
| 2016/0364003 A1 * | 12/2016 | O'Brien | G03H 1/0005 |
| 2022/0349220 A1 | 11/2022 | Ferri et al. | |

* cited by examiner

VEHICULAR CLOSURE OPENING DEVICE USING A MICRO-LENS ARRAY AT CLOSURE PANEL

CROSS REFERENCE TO RELATED APPLICATION

The present application claims the filing benefits of U.S. provisional application Ser. No. 63/369,074, filed Jul. 22, 2022, which is hereby incorporated herein by reference in its entirety.

FIELD OF THE INVENTION

The present invention relates to handles for vehicle closure panels and, more particularly, to an exterior door handle for opening a door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

A vehicular closure panel handle system includes a closure panel handle assembly or device configured to mount at a handle region of a closure panel or door of a vehicle. The closure panel handle assembly includes a projection device and a sensor. With the handle assembly mounted at the handle region of the closure panel, the projection device is electrically operable to emit light at an outer surface of the closure panel, the emitted light being visible to a user exterior of the vehicle. The light emitted by the projection device projects a three-dimensional (3D) hologram (i.e., a virtual icon or handle representation) that appears to be extending from a handle region of the outer surface of the closure panel (such as a 3D representation of a vehicle door handle). An electronic control unit (ECU) includes electronic circuitry and associated software, including a data processor for processing sensor data captured by the sensor. The sensor views the handle region of the outer surface of the closure panel to sense at least a portion of the region wherein the 3D hologram is projected at the outer surface of the closure panel. With the handle assembly mounted at the handle region of the door, the sensor captures sensor data, such as representative of light reflected from an object (e.g., the user's hand) at or near the handle region of the door. The system, while the projection device projects the 3D hologram at the outer surface of the door and based on processing at the ECU of captured sensor data, determines presence of the object or user's hand at or near the projected 3D hologram. The system, responsive to determining presence of the object or user's hand at or near the projected 3D hologram, unlatches the closure panel and may operate an actuator to move the closure panel from a closed position toward an open position.

These and other objects, advantages, purposes and features of the present invention will become apparent upon review of the following specification in conjunction with the drawings.

DESCRIPTION OF THE PREFERRED EMBODIMENTS

Figure 1:
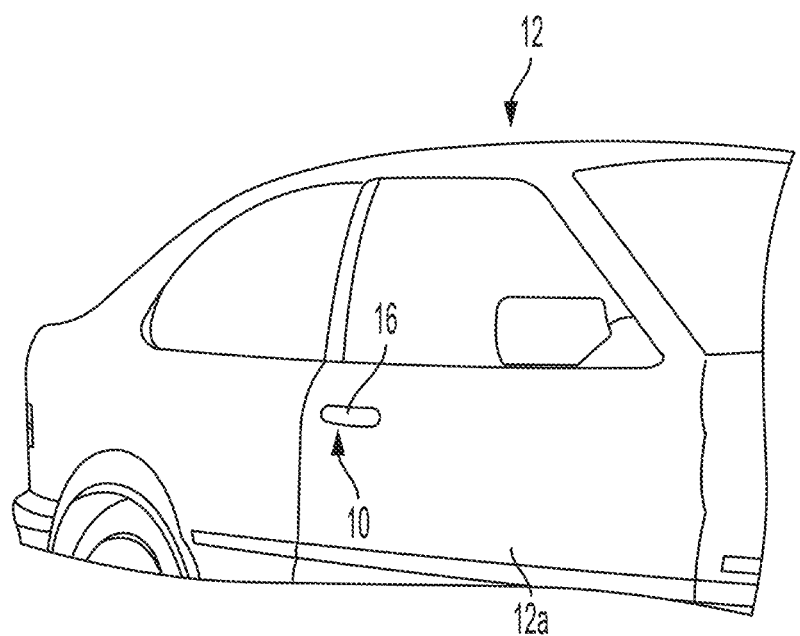
FIG. 1 is a perspective view of a vehicle equipped with a closure panel handle assembly.
Figure 2:
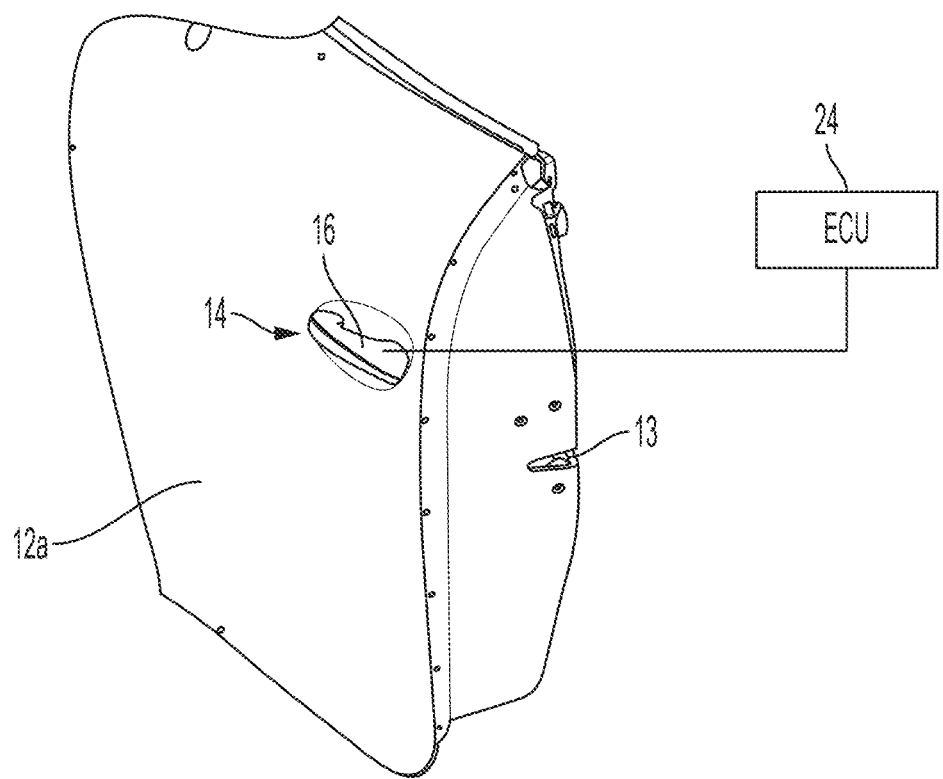
FIG. 2 is a perspective view of the door of the vehicle equipped with the closure panel handle assembly.

Referring now to the drawings and the illustrative embodiments depicted therein, a vehicle door handle system or closure panel handle system 10 includes a virtual handle assembly or projection device 14 disposed at a door 12a of a vehicle 12 and that is electrically operable to emit light to project an image or projection or hologram 16 at the exterior surface of the door 12a. The door handle system 10 is operable to actuate a latch mechanism 13 of the door 12a to open the vehicle door based on a user input or interaction with the light of the projection 16 and/or a user input at the area or region at or around the projection 16 (FIGS. 1 and 2). As described herein, the door handle system 10 may not provide a physical handle for a user to grasp and/or pull like a traditional door handle. Instead, the door handle system 10 provides light that forms the virtual door handle or projection or hologram 16 of a door handle at the exterior surface of the door 12a. When the user interacts with the image or projection or hologram 16 (such as by simulating a grasping motion or swiping their hand through the hologram), the latch mechanism is actuated or released, and a power swing door actuator disposed at the door may be actuated to swing the door 12a from a closed position toward an open position. For example, the door actuator may utilize characteristics of the systems described in U.S. Pat. No. 10,378,263, which is hereby incorporated herein by reference in its entirety. Optionally, aspects of the door handle system may be suitable for use with a liftgate handle assembly for a liftgate or tailgate of a vehicle.

Traditional mechanical door handles provide a physical contact handle for users attempting to unlock and enter the vehicle and for members of the public (e.g., passersby or non-users) to touch when the vehicle is parked. As such, the surface of mechanical door handles may collect dirt and dust and may more easily spread viruses and illnesses. Additionally, physical or mechanical door handles typically protrude from the outer surface of the door and thus contribute to aerodynamic drag. Furthermore, physical door handles are prone to mechanical failures, such as during cold environmental conditions physical door handles may accumulate ice and/or snow making the handle difficult to grasp and operate or precluding the door handle from moving relative to the door. Thus, the door handle hologram that does not require physical contact from a user to open the door provides a more sanitary, more aerodynamic and more reliable door opening solution.

Figure 3:
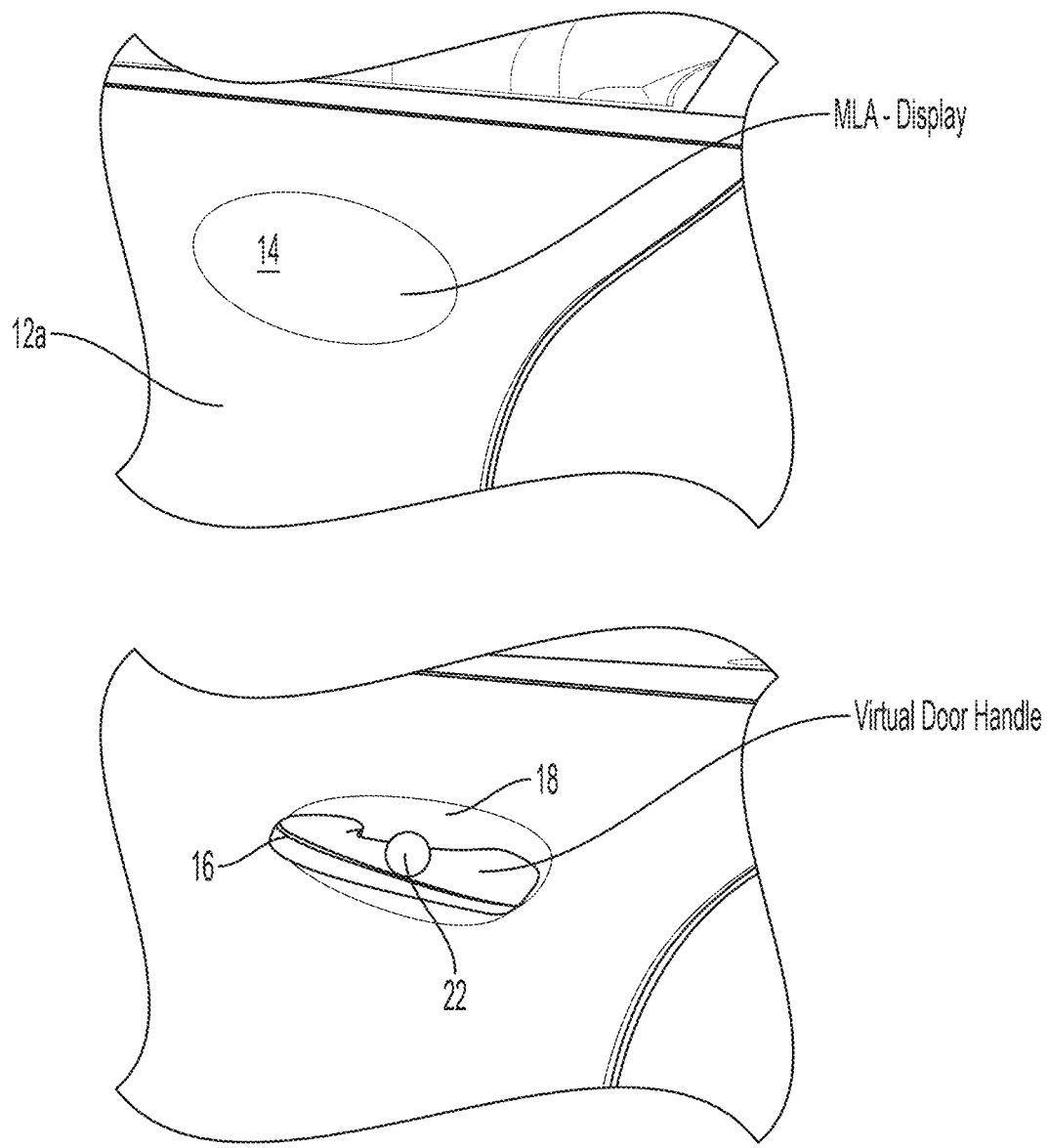
FIG. 3 is a perspective view of the closure panel handle assembly, showing the closure panel handle assembly in an inactive state and an active state.

Referring to FIGS. 2 and 3, the virtual handle assembly 14 is disposed at a door handle region of the door 12a and is electrically operable to generate the projection 16 and sense the user's interaction with, or movement relative to, the projection 16. The virtual handle assembly 14 may be integrated into the sheet panel or closure panel of the door 12a and/or disposed flush with the outer surface of the door 12a so that, when not operated or in an inactive state, the hologram 16 is not projected and the door 12a has a smooth, uninterrupted surface. When the virtual handle assembly 14 is not being operated, a viewer may not be able to discern the location of the virtual handle assembly 14 on the door panel. Alternatively, the virtual handle assembly 14 may be disposed in or at or near a pocket or recess 18 formed in the door 12a to identify the location of the holographic door handle and to accommodate a user's hand when simulating a grasping or swiping motion at or through the hologram 16. Further, an image or icon (e.g., a two dimensional image or icon) may be formed at the door handle region of the door 12a to mark the position of the handle assembly 14 when the hologram 16 is not projected at the door 12a.

The virtual door handle assembly 14, when electrically operated or in an activated state, generates the projection 16 of a door handle at the outer surface of the door 12a. In other words, the virtual door projection indicates the location of the door handle and is ready to receive the user input (e.g., the user interaction with the projection) to activate the latch mechanism and/or the door actuator. The projection 16, when generated, may provide any suitable image or icon at the outer surface of the door 12a, such as a hologram representative of a door handle, or other image prompting interaction from the user. For example, the projection 16 may include an arrow (e.g., a downward arrow) prompting the user to pass their hand through the projection 16 in the direction of the arrow to activate the door actuator.

Figure 4:
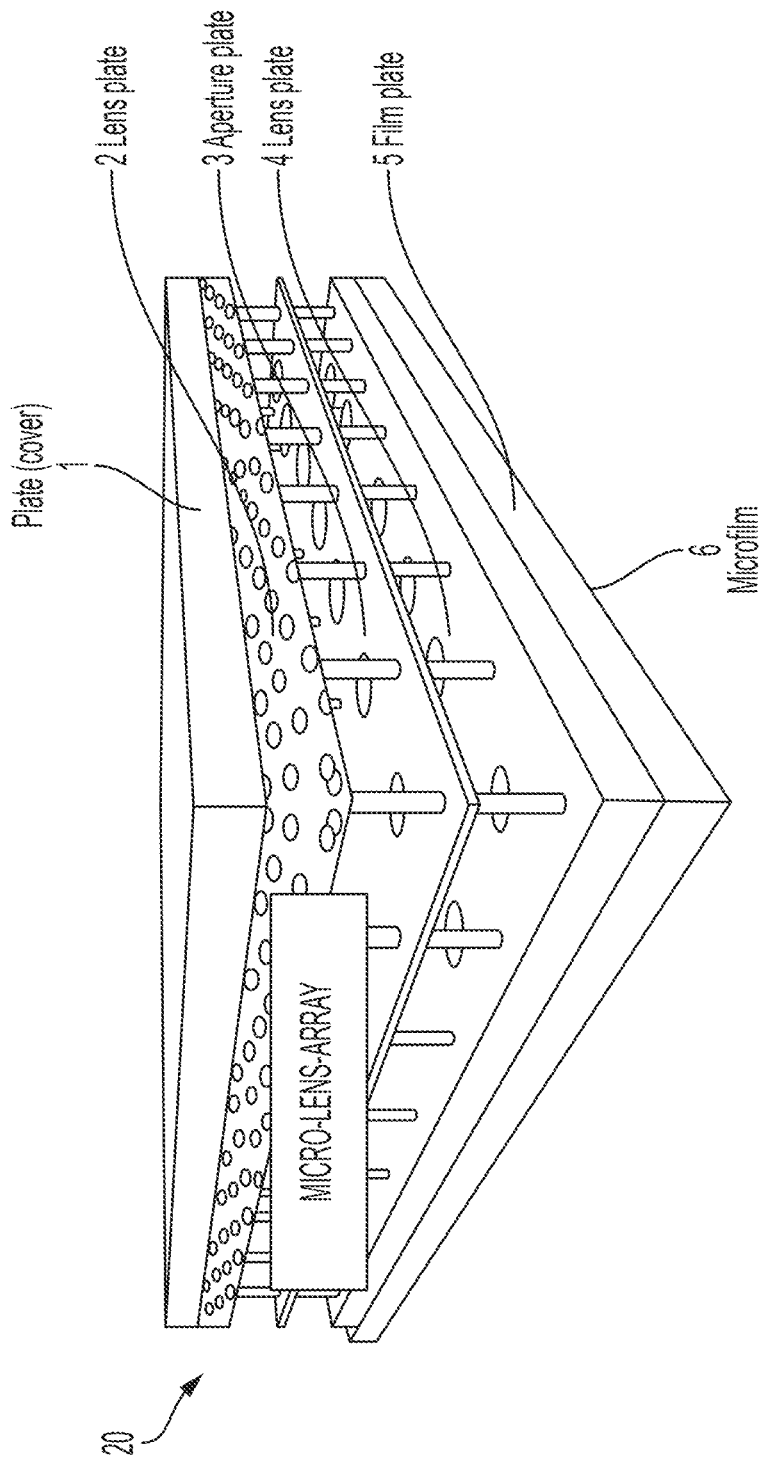
FIG. 4 is a perspective view of an LED-powered MLA display device of the closure panel handle assembly.

The projection 16 displays a three-dimensional (3D) image or hologram at the outer surface of the door 12a that is generated using a two-dimensional (2D) display device 20 of the virtual door handle assembly 14 (FIG. 4). Thus, the 2D display device 20 generates the 3D hologram 16 so that the user may interact with the hologram (e.g., pass their hand through light forming the hologram) without physically contacting the display device 20 or door 12a. The display device 20 may comprise any suitable holographic image generator configured to generate 3D images. In the illustrated example, the display device 20 includes a light emitting diode (LED) powered micro lens array (MLA) that is a substantially flat or 2D display device at the door 12a. The MLA display 20 converts a microfilm image (such as an image of a door handle) into a 3D flying door handle projection 16 that can be viewed at the door panel with the naked eye. The MLA display 20 includes a microfilm, a film plate over the microfilm, an aperture plate sandwiched between individual lens plates and over the film plate, and an outer plate or cover at the outer surface of the door 12a.

The display device 20 is integrated with time of flight (ToF) technology to enable contactless vehicle access. That is, the virtual door handle assembly 14 further includes a ToF sensor 22 (FIG. 3), such as a light detector, configured to sense presence of an object (e.g., the user's hand) at the door handle region (and optionally, distance and movement of the object relative to the door handle region) when the display device 20 is displaying the door handle hologram 16. Thus, when the door handle hologram 16 is displayed at the door handle region of the door 12a and the sensor 22 senses presence and/or movement of the user's hand at the door handle region, the door handle assembly 10 may unlock the door and/or activate the door actuator based on the determined presence and/or movement of the user's hand.

The ToF sensor 22 may be integrated with the display device 20 such that the ToF sensor 22 senses presence and/or movement of the user's hand relative to the hologram 16 based on light of the hologram 16 reflected from the user's hand. For example, the sensor 22, when the hologram 16 is projected, may sense a baseline or default pattern representative of the uninterrupted hologram 16. When the user interacts with the hologram 16, the pattern of light sensed by the sensor 22 changes (e.g., the amount of light or the reflectance time/distance measured by the sensor changes) and the system determines presence and/or movement of the user's hand based on the change in the pattern of light sensed. The system may further determine gestures performed by the user, such as a gesture simulating grasping and pulling the door handle hologram 16 or a direction of movement of the user's hand, based on the detected light reflection patterns. For example, the system may lock or unlock the door based on determined movements or gestures, or may open or close the door based on determined movements or gestures, or may open or close a window of the vehicle or door based on determined movements or gestures.

Optionally, the virtual handle assembly 14 may incorporate other types of sensors to determine presence and/or movement of the user's hand relative to the hologram 16, such as an imaging sensor, a proximity sensor such as a radar antenna and sensor or infrared light emitter and detector, or the like. For example, a radar sensor may be disposed behind the vehicle cover panel 12a and configured to sense presence and determine movement of objects at or near the door handle region of the cover panel. When the hologram 16 is projected at the outer surface of the cover panel 12a, sensor data captured by the radar sensor may be processed to determine presence of an object (e.g., a user's hand) at or near the handle region of the cover panel 12a and interacting with the projected hologram 16. For example, the system may track position of a detected object relative to a known or expected position of the projected hologram 16 to determine interaction and movement of the detected object with the projected hologram 16.

Optionally, the projection generated by the virtual handle assembly 14 may include a 3D holographic kick target that prompts the user to place their foot or leg at or near the kick target (such as prompting the user to swing their foot through the 3D hologram) to unlock and/or open the closure panel associated with the virtual handle assembly 14. For example, the virtual handle assembly 14 may project the 3D holographic kick target at or near the ground surface along the side of a trunk or liftgate or sliding door or hinged door of the vehicle, and based on sensing an object (such as the user's foot or leg) at or near the kick target, the latch mechanism of the associated closure panel is released and/or an actuator is operated to open the closure panel. The virtual handle assembly that projects the 3D kick target may be disposed at a lower edge region of the closure panel or at a lower portion of the vehicle near the closure panel, such as mounted at a rear bumper of the vehicle near an associated liftgate or at a lower body panel or rocker panel of the vehicle near an associated side sliding door. The virtual handle assembly may utilize characteristics of the projection and sensing modules and control systems described in U.S. Pat. No. 10,589,716, which is hereby incorporated herein by reference in its entirety.

Thus, the system 10 includes an electronic control unit (ECU) 24 in communication with the virtual handle assembly 14 and including electronic circuitry and associated software (FIG. 2). The ECU 24 may communicate signals to the virtual handle assembly 14 to activate the display device 20 to project the hologram 16 to the user. The electronic circuitry of the ECU 24 may include a data processor configured to process sensor data captured by the ToF sensor 22 and other sensors associated with the system 10 to determine presence and movement of the user's hand relative to the projection 16. The ECU 24 may include an image processor configured to process image data captured by the imaging sensor. For example, the data or image processor may comprise a processing chip selected from the EYEQ family of processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze sensor and/or image data to detect the user's hand and/or other objects.

The system 10 measures object distance by comparing the modulation phase or calculating a time of flight of the light from the object, such as by utilizing processes such as those described in U.S. Pat. Nos. 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, which are hereby incorporated herein by reference in their entireties.

Figure 5:
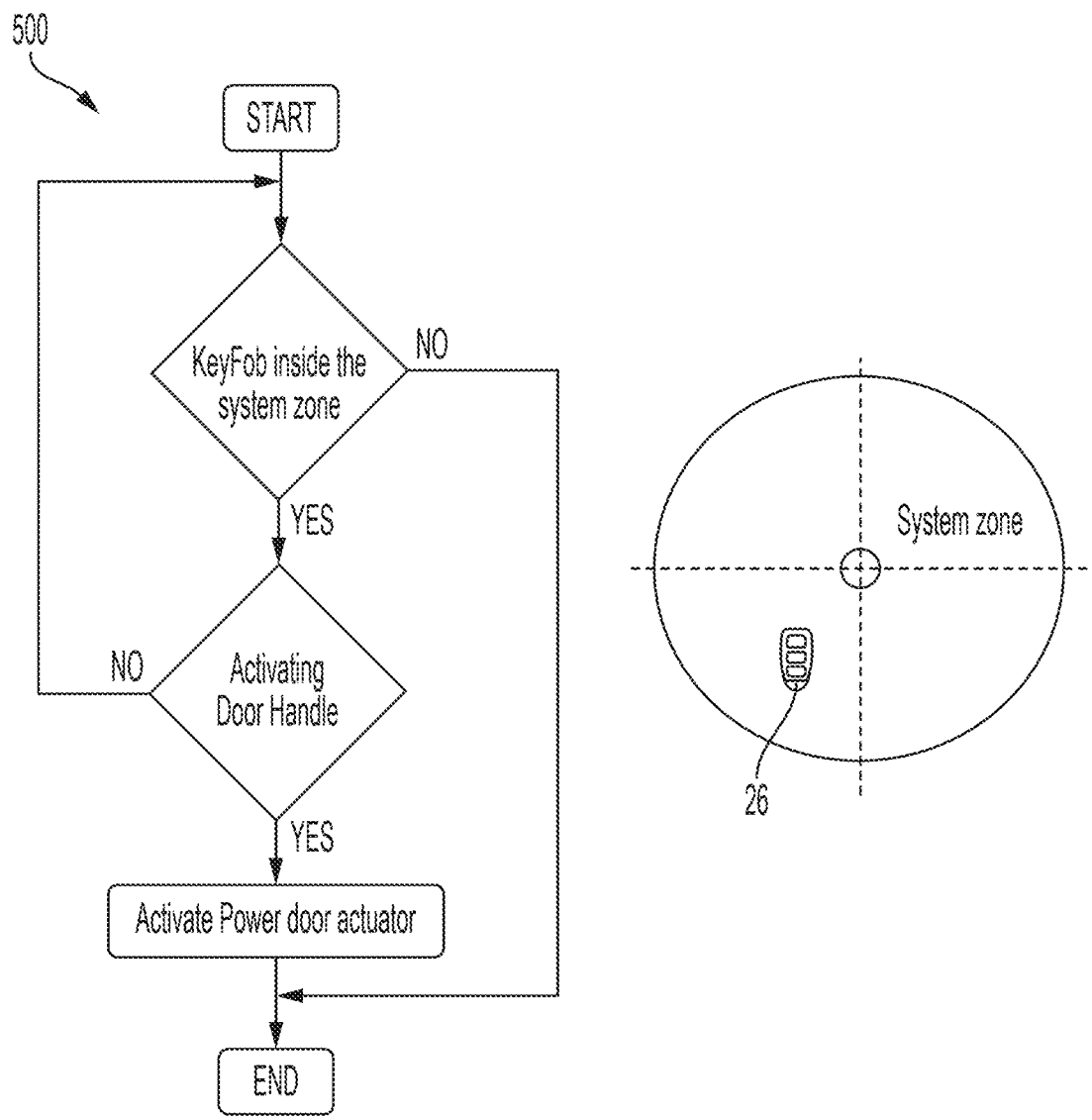
FIG. 5 is a flow chart showing a method of operating the closure panel handle assembly in conjunction with a passive keyfob detection system of the vehicle.

Referring to FIG. 5, the door handle system 10 may activate the display device 20 to illuminate or project the image of the door handle responsive to an input, such as a user actuated input or a sensor at the vehicle sensing presence of the user at the side of the vehicle. FIG. 5 depicts a flow chart 500 showing a method of operating the virtual door handle assembly in conjunction with a passive keyfob detection system of the vehicle. Thus, the system 10 may communicate with or sense presence of a keyfob 26 associated with the vehicle 12 and/or authorized to operate the virtual door handle assembly 14 and request access to the vehicle 12. Responsive to detecting presence of the authorized keyfob in the vicinity of the vehicle, such as within a detection range or zone, the system operates the virtual door handle assembly 14 to provide the projection 16. Responsive to the user interacting with the projection 16, the door handle system 10 activates the door actuator to provide access to the vehicle.

The vehicle may be equipped with virtual or projected door handle assemblies at one or more closure panels of the vehicle, such as each door, a tailgate or liftgate or trunk of the vehicle and a hood or engine compartment closure panel of the vehicle. When the system is activated, the system may project images or holograms at each door or closure panel of the vehicle so that one or more doors may be opened (e.g., the driver and one or more pedestrians may each open their respective doors). Optionally, the system detects presence of the user (or the keyfob 26) at a particular region exterior the vehicle and corresponding to a respective door of the vehicle. In response to determining presence of the user at the respective door, the door handle system may project the hologram 16 only at that respective door, such as to conserve power consumption or prevent false activation of the system or prevent an unauthorized person from opening another door of the vehicle.

Optionally, the door handle system 10 may be operable to perform different functions responsive to different gestures or movements performed by the user. For example, if the user performs a first gesture relative to the hologram 16 (such as passing their hand through the hologram in a first direction), the door handle system 10 performs a first action (e.g., operate a lock/unlock function of the door), and if the user performs a second gesture relative to the hologram 16 (such as passing their hand through the hologram in a second direction, which may be opposite to the first direction), the door handle system 10 performs a second action (e.g., operate the door actuator to open the door).

Thus, the door handle system 10 provides a contactless way of accessing the vehicle via ToF distance measurement relative to a hologram 16 at the door handle region of the vehicle door. The MLA display device 20 generates the hologram 16 and is powered with the help of integrated LEDs that provide the virtual, floating, 3D door handle with infinite depth possibilities.

The door handle system is thus operable to open the vehicle door when a user grasps at or swipes at the hologram of the virtual door handle at the side of the vehicle door. The door handle system may also be operable in conjunction with a passive keyless entry or other sensing system that is operable to determine whether or not the person at the vehicle door is authorized for entry into the vehicle, and may only project the virtual door handle and/or open the vehicle door when that system recognizes the user or key fob or transmitting device associated with the owner or authorized user of the vehicle. Optionally, the door handle system may be associated with or in communication with a door zone module, such as by utilizing aspects of the vehicle door systems described in U.S. Pat. Publication No. US-2010-0007463, which is hereby incorporated herein by reference in its entirety.

Optionally, the system may be operable by projecting a 2D image or icon at the exterior surface of the door when the system is activated and ready to receive the user input for releasing the latch mechanism of the door and/or operating the door actuator to move the door from the closed position to the open position. For example, the door handle assembly may illuminate a 2D image or icon or indicator light at the exterior surface of the door to indicate the region where the user should provide the input. Responsive to sensing the user's hand or hand motion at the indicated region (such as via processing image data captured by a camera viewing the door handle region or via processing radar sensor data captured by a radar sensor viewing the door handle region), the system releases the door latch mechanism and/or moves the door to the open position.

Optionally, the sensor may comprise a sideward viewing camera of the vehicle (such as a camera that views sideward and rearward for a sideward or rearward monitoring system of the vehicle, and the door opening system may determine presence of and/or identification of the user via image processing of image data captured by the sideward viewing camera of the vehicle (such that the system can identify the user using facial recognition software) and may determine if the user is an authorized user before unlocking the door or projecting the virtual door handle. Optionally, the system may determine presence of and movement of or gesture by (e.g., swiping, grasping and the like) a hand of the user via image processing of image data captured by a sideward viewing camera of the vehicle. The system may determine presence and/or gestures or motion of a user's hand by utilizing aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906;

US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or PCT Application No. PCT/US2023/021799, filed May 11, 2023, which are all hereby incorporated herein by reference in their entireties.

Optionally, the door handle system may include a light module or lighting element, such as a ground illumination light and/or other light or lighting element, such as a projection light or the like, such as by utilizing aspects of the door handle assemblies and lighting systems described in U.S. Pat. Nos. 8,801,245; 8,786,401; 5,371,659; 5,497,305; 5,823,654; 6,349,450 and/or 6,550,103, and/or U.S. Pat. Publication No. US-2010-0088855, which are hereby incorporated herein by reference in their entireties.

Optionally, the door handle system may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,671,996; 5,497,305; 6,416,208 and/or 6,568,839, all of which are hereby incorporated herein by reference in their entireties), or the vehicle ignition, or any other desired system.

The door handle system may utilize sensors, such as radar sensors or imaging radar sensors or lidar sensors or the like, to detect presence of and/or range to objects. For example, the system and sensors may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular closure panel opening system, the vehicular closure panel opening system comprising:
   a closure panel handle assembly configured to mount at a closure panel of a vehicle equipped with the vehicular closure panel opening system, wherein the closure panel handle assembly comprises a projection device;
   a sensor disposed at or near the closure panel of the vehicle;
   wherein, with the closure panel handle assembly mounted at the closure panel, the projection device is at the closure panel of the vehicle and the projection device is electrically operable to emit light outward away from the closure panel of the vehicle;
   wherein light emitted by the projection device projects a three-dimensional (3D) hologram at a handle region of an outer surface of the closure panel and viewable by a user exterior of the vehicle, and wherein, with the 3D hologram projected at the handle region of the outer surface of the closure panel, the 3D hologram is at least partially outboard of the closure panel and exterior of the vehicle;
   an electronic control unit (ECU) comprising electronic circuitry and associated software, wherein the electronic circuitry comprises a data processor for processing sensor data captured by the sensor;
   wherein, with the 3D hologram projected at the handle region of the outer surface of the closure panel, the sensor is operable to sense objects at the handle region of the outer surface of the closure panel, and wherein the sensor captures sensor data;
   wherein the vehicular closure panel opening system, with the 3D hologram projected at the handle region of the outer surface of the closure panel and based on processing at the ECU of captured sensor data, determines presence of an object at or near the projected 3D hologram; and
   wherein the vehicular closure panel opening system, responsive to determining presence of the object at or near the projected 3D hologram, actuates a latch mechanism of the closure panel to release the latch mechanism and allow the closure panel to move from a closed position toward an open position.

2. The vehicular closure panel opening system of claim 1, wherein the projected 3D hologram comprises a representation of a vehicular door handle.

3. The vehicular closure panel opening system of claim 1, wherein the projection device comprises an LED-powered micro lens array (MLA).

4. The vehicular closure panel opening system of claim 1, wherein, with the closure panel handle assembly mounted at the closure panel, the projection device is flush with the outer surface of the closure panel.

5. The vehicular closure panel opening system of claim 1, wherein the closure panel comprises a pocket at the outer surface of the closure panel, and wherein, with the 3D hologram projected at the handle region of the outer surface of the closure panel, the 3D hologram is projected at least partially at the pocket.

6. The vehicular closure panel opening system of claim 1, wherein the vehicular closure panel opening system, with the 3D hologram projected at the handle region of the outer surface of the closure panel and based on processing at the ECU of captured sensor data, determines presence of the object at the projected 3D hologram.

7. The vehicular closure panel opening system of claim 1, wherein the vehicular closure panel opening system, with the 3D hologram projected at the handle region of the outer surface of the closure panel and based on processing at the ECU of captured sensor data, determines movement of the object relative to the projected 3D hologram.

8. The vehicular closure panel opening system of claim 7, wherein the vehicular closure panel opening system operates the latch mechanism of the closure panel responsive to determining, via processing at the ECU of captured sensor data, a predefined movement of the object relative to the projected 3D hologram.

9. The vehicular closure panel opening system of claim 8, wherein the vehicular closure panel opening system determines that the object comprises a user's hand, and wherein the predefined movement is a swiping motion of the user's hand through the projected 3D hologram.

10. The vehicular closure panel opening system of claim 1, wherein the projection device is electrically operated to emit light responsive to an input.

11. The vehicular closure panel opening system of claim 10, wherein the input comprises a signal from a passive keyfob detection system of the vehicle indicating presence of an authorized keyfob at or near the vehicle.

12. The vehicular closure panel opening system of claim 10, wherein the input comprises a user actuatable input from an authorized keyfob associated with the vehicle.

13. The vehicular closure panel opening system of claim 1, wherein the vehicular closure panel opening system determines that the object comprises a user's hand.

14. The vehicular closure panel opening system of claim 1, wherein the vehicular closure panel opening system, with the latch mechanism of the closure panel released and responsive to determining continued presence of the object at or near the projected 3D hologram, operates an actuator to move the closure panel from the closed position toward the open position.

15. The vehicular closure panel opening system of claim 1, wherein the sensor captures sensor data representative of light from the projected 3D hologram and reflected from the object.

16. The vehicular closure panel opening system of claim 1, wherein the sensor comprises a sideward viewing camera of the vehicle that views the handle region, and wherein the sideward viewing camera captures image data.

17. The vehicular closure panel opening system of claim 1, wherein the sensor comprises a radar sensor disposed behind the outer surface of the closure panel and sensing the handle region through the outer surface of the closure panel.

18. The vehicular closure panel opening system of claim 1, wherein the closure panel comprises one selected from the group consisting of (i) a vehicular door, (ii) a vehicular liftgate, (iii) a vehicular tailgate, (iv) a vehicular trunk and (v) a vehicular hood panel.

19. A vehicular closure panel opening system, the vehicular closure panel opening system comprising:

a closure panel handle assembly configured to mount at a closure panel of a vehicle equipped with the vehicular closure panel opening system, wherein the closure panel handle assembly comprises a projection device, and wherein the closure panel comprises a door of the vehicle;

a sensor disposed at or near the closure panel of the vehicle;

wherein, with the closure panel handle assembly mounted at the closure panel, the projection device is at the closure panel of the vehicle and the projection device is electrically operable to emit light outward away from the closure panel of the vehicle;

wherein light emitted by the projection device projects a three-dimensional (3D) hologram at a handle region of an outer surface of the closure panel and viewable by a user exterior of the vehicle, and wherein, with the 3D hologram projected at the handle region of the outer surface of the closure panel, the 3D hologram is at least partially outboard of the closure panel and exterior of the vehicle;

wherein the projection device is electrically operated to emit light responsive to a passive keyfob detection system of the vehicle indicating presence of an authorized keyfob at or near the vehicle;

an electronic control unit (ECU) comprising electronic circuitry and associated software, wherein the electronic circuitry comprises a data processor for processing sensor data captured by the sensor;

wherein, with the 3D hologram projected at the handle region of the outer surface of the closure panel, the sensor is operable to sense objects at the handle region of the outer surface of the closure panel, and wherein the sensor captures sensor data;

wherein the vehicular closure panel opening system, with the 3D hologram projected at the handle region of the outer surface of the closure panel and based on processing at the ECU of captured sensor data, determines presence of a user's hand at or near the projected 3D hologram;

wherein the vehicular closure panel opening system, responsive to determining presence of the user's hand at or near the projected 3D hologram, actuates a latch mechanism of the closure panel to release the latch mechanism and allow the closure panel to move from a closed position toward an open position; and wherein the vehicular closure panel opening system, with the latch mechanism of the closure panel released and responsive to determining continued presence of the user's hand at or near the projected 3D hologram, operates an actuator to move the closure panel from the closed position toward the open position.

20. The vehicular closure panel opening system of claim 19, wherein the projected 3D hologram comprises a representation of a vehicular door handle.

21. The vehicular closure panel opening system of claim 19, wherein the projection device comprises an LED-powered micro lens array (MLA).

22. The vehicular closure panel opening system of claim 19, wherein the vehicular closure panel opening system, with the 3D hologram projected at the handle region of the outer surface of the closure panel and based on processing at the ECU of captured sensor data, determines movement of the user's hand relative to the projected 3D hologram.

23. The vehicular closure panel opening system of claim 22, wherein the vehicular closure panel opening system operates the latch mechanism of the closure panel responsive to determining, via processing at the ECU of captured sensor data, a predefined movement of the user's hand relative to the projected 3D hologram.

24. The vehicular closure panel opening system of claim 19, wherein the sensor captures sensor data representative of light from the projected 3D hologram and reflected from the user's hand.

25. A vehicular closure panel opening system, the vehicular closure panel opening system comprising:

a closure panel handle assembly configured to mount at a closure panel of a vehicle equipped with the vehicular closure panel opening system, wherein the closure panel handle assembly comprises a projection device, and wherein the closure panel comprises a door of the vehicle;

a sensor disposed at or near the closure panel of the vehicle;

wherein, with the closure panel handle assembly mounted at the closure panel, the projection device is at the closure panel of the vehicle and the projection device is electrically operable to emit light outward away from the closure panel of the vehicle;

wherein light emitted by the projection device projects a three-dimensional (3D) hologram at a handle region of an outer surface of the closure panel and viewable by a user exterior of the vehicle, and wherein the projected 3D hologram comprises a representation of a vehicular door handle, and wherein, with the 3D hologram projected at the handle region of the outer surface of the closure panel, the 3D hologram is at least partially outboard of the closure panel and exterior of the vehicle;

an electronic control unit (ECU) comprising electronic circuitry and associated software, wherein the electronic circuitry comprises a data processor for processing sensor data captured by the sensor;

wherein, with the 3D hologram projected at the handle region of the outer surface of the closure panel, the sensor is operable to sense objects at the handle region of the outer surface of the closure panel, and wherein the sensor captures sensor data representative of light from the projected 3D hologram and reflected from objects at the handle region;

wherein the vehicular closure panel opening system, with the 3D hologram projected at the handle region of the outer surface of the closure panel and based on processing at the ECU of captured sensor data, determines presence of a user's hand at or near the projected 3D hologram;

wherein the vehicular closure panel opening system, with the 3D hologram projected at the handle region of the outer surface of the closure panel and based on processing at the ECU of captured sensor data, determines movement of the user's hand relative to the projected 3D hologram; and wherein the vehicular closure panel opening system, responsive to determining presence of the user's hand at or near the projected 3D hologram, and responsive to determining a predefined movement of the user's hand relative to the projected 3D hologram, actuates a latch mechanism of the closure panel to release the latch mechanism and allow the closure panel to move from a closed position toward an open position.

26. The vehicular closure panel opening system of claim 25, wherein the projection device comprises an LED-powered micro lens array (MLA).

27. The vehicular closure panel opening system of claim 25, wherein the predefined movement is a swiping motion of the user's hand through the projected 3D hologram.

28. The vehicular closure panel opening system of claim 25, wherein the projection device is electrically operated to emit light responsive to an input.

29. The vehicular closure panel opening system of claim 28, wherein the input comprises a signal from a passive keyfob detection system of the vehicle indicating presence of an authorized keyfob at or near the vehicle.

30. The vehicular closure panel opening system of claim 28, wherein the input comprises a user actuatable input from an authorized keyfob associated with the vehicle.

* * * * *

UNITED STATES PATENT AND TRADEMARK OFFICE
CERTIFICATE OF CORRECTION

Page 1 of 1

PATENT NO. : 12,385,315 B2
APPLICATION NO. : 18/355482
DATED : August 12, 2025
INVENTOR(S) : Sethuraman Ravichandran It is certified that error appears in the above-identified patent and that said Letters Patent is hereby corrected as shown below:

In the Specification

<u>Column 5</u>
Line 36, "system operates" should be --system 10 operates--

<u>Column 7</u>
Lines 15-16, "5,497,305; 5,823,654;" should be --5,497,305; 5,669,699; 5,823,654;--
Line 44, "6,086,229; 5,671,996;" should be --6,086,229; 5,938,321; 5,671,996;--

Signed and Sealed this
Ninth Day of September, 2025

Coke Morgan Stewart
*Acting Director of the United States Patent and Trademark Office*